United States Patent [19]
Engwall

[11] 3,926,250
[45] Dec. 16, 1975

[54] WORK CABIN FOR UNHEALTHY ENVIRONMENTS

[75] Inventor: Bertil Engwall, Solna, Sweden

[73] Assignee: AB Sveadiesel, Solna, Sweden

[22] Filed: Dec. 6, 1973

[21] Appl. No.: 422,142

[30] Foreign Application Priority Data
Dec. 7, 1972 Sweden.............................. 15993/72

[52] U.S. Cl. .................. 165/48; 165/108; 165/122; 165/169
[51] Int. Cl.² ......................................... F25B 29/00
[58] Field of Search ............. 165/48, 169, 108, 122, 165/82

[56] References Cited
UNITED STATES PATENTS
1,564,566  12/1925  Harris ................................. 165/108
2,619,803  12/1952  Doering ............................. 165/108

Primary Examiner—Charles J. Myhre
Assistant Examiner—William C. Anderson
Attorney, Agent, or Firm—Holman & Stern

[57] ABSTRACT

A work cabin for unhealthy environments, comprising two cabin-shaped sections, an outer and an inner section, said sections being separated from each other by an air column and vibration reducing elements, also including means for circulation of the air from the surrounding air column through the inside cabin section and via an air filter back to the surrounding air column, said filter being the inside filter element of a filter unit communicating with the surrounding atmosphere. The work cabin also including means for controlling the temperature of the air circulated through the work cabin.

10 Claims, 4 Drawing Figures

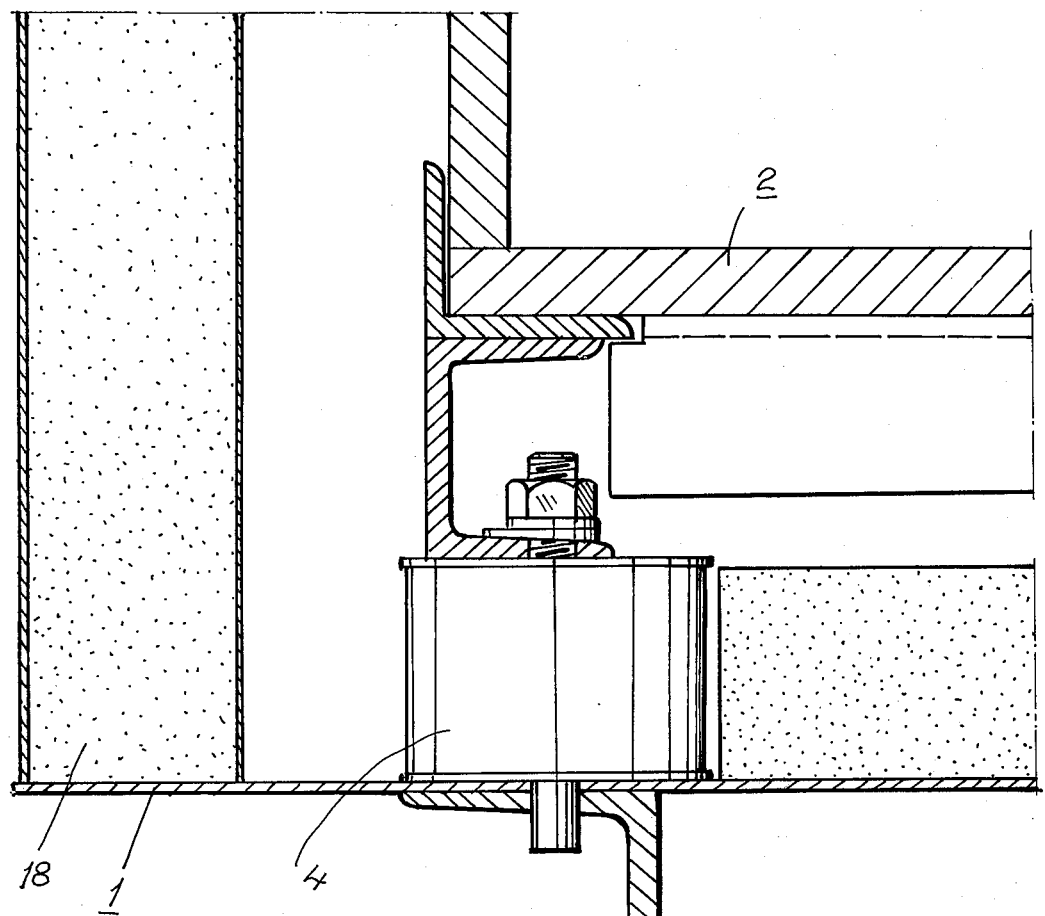
Fig. 3
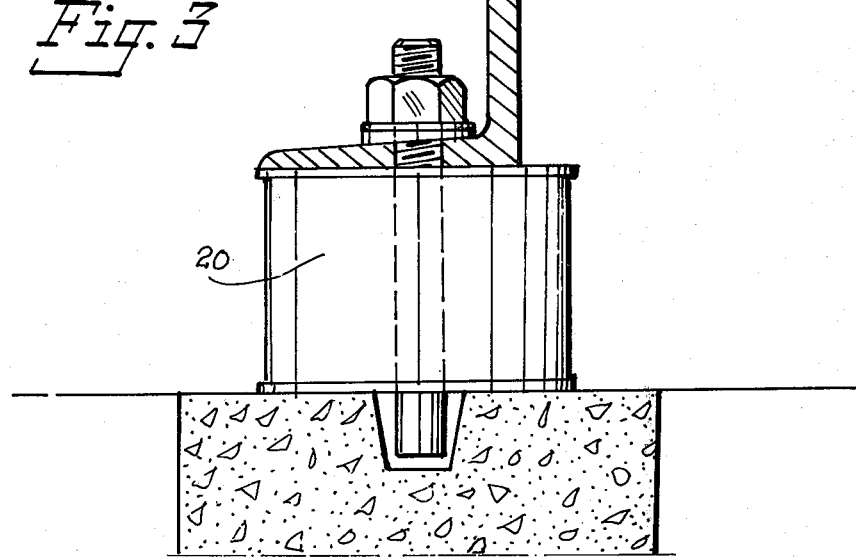

WORK CABIN FOR UNHEALTHY ENVIRONMENTS

BACKGROUND OF THE INVENTION

The present invention concerns a work cabin for unhealthy environments, primarily intended to provide protection against polluted air, e.g. air filled with stone dust, but also intended to provide protection against vibrations and high noise levels as well as unfavourable climatic conditions. The work cabin according to the present invention is hereby obviously suitable as a working or operating position, e.g. at a crushing plant for stone or other materials.

Cabin-shaped working places for stated and similar purposes have existed before, the walls, ceiling and floor being made from sound-absorbing materials and with an air filter in combination with a fan for fresh air supply to the cabin. The purified air supplied is discharged from the cabin through a vent to the surrounding air outside. This known type of cabin-shaped working place is, however, marred by significant disadvantages. One example is that a relatively great flow of air through the air filter is necessary, which results in rapid contamination of the air filter and stoppage, as well as high air circulation with consequent draughts in the cabin. Temperature regulation of the air supply is difficult to achieve is a satisfactory way and entails great energy consumption. Furthermore, the degree to which the air supply is purified is often insufficient. An additional disadvantage is that the soundabsorbing effect is often limited. Another desire, namely a vibration-reducing effect, has not been met either, which means that the person who stays in the cabin is subjected to harmful vibrations from machines, crushers or other nearby vibration-producing units.

SUMMARY OF THE INVENTION

With a work cabin according to the present invention, all of the above-mentioned disadvantages of cabins of previously-known types are overcome. Furthermore, additional advantages are gained, as outlined in the following description of an embodiment of a cabin according to the present invention.

The work cabin according to the present invention is primarily characterized by the fact that it comprises of two cabin-shaped sections, separated from each other by means of a surrounding air column. The inner cabin-shaped section is arranged in connection with the aforesaid air column by means of one or more inlets, in addition to which a fan unit with at least two air filter elements separated from each other is arranged to provide purified air to the inner cabin-shaped section via the air column and inlets. Thereafter the air is returned through an outlet unit to a point between the two filter elements.

The work cabin according to the present invention is further characterized by the fact that the inner cabin-shaped section is separated from the outer cabin-shaped section by a number of vibration-reducing elements made of an elastic material.

An additional characteristic feature of the work cabin according to the present invention is that a unit for regulating the area of circulation at the inlets and/or outlets of the inner cabinshaped section is arranged and that the inside of outer cabin-shaped section is covered with a sound and heat insulating material. In addition to this, a characteristic feature is that the inner cabin-shaped section is connected to the surrounding atmosphere of the outer cabin-shaped section by means of a ventilation unit, arranged to open when the pressure inside the inner cabin-shaped section exceeds normal working pressure.

BRIEF DESCRIPTION OF THE DRAWINGS

An embodiment of a work cabin according to the present invention is more fully described below with reference to the accompanying drawings, wherein:

FIG. 3 is an enlarged partial cross-sectional view of a part of the lower portion of the work cabin, fastened to a foundation;

DETAILED DESCRIPTION OF THE PREFERRED EMBODIMENTS

Figure 1:
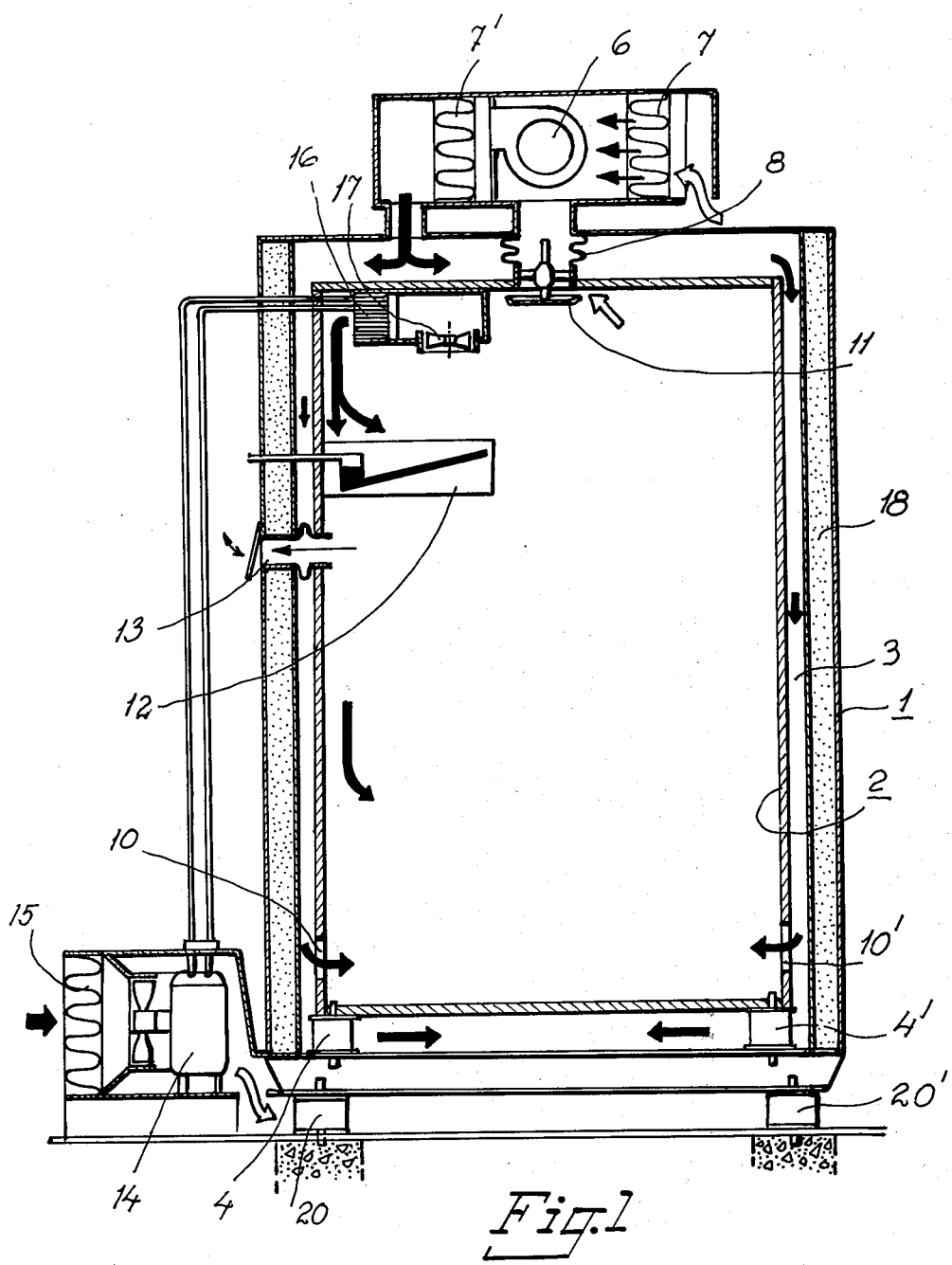
FIG. 1 is a side elevation cross-section of a work cabin according to the present invention.

In the drawings, 1 denotes as a whole the outer cabin-shaped container or section which encloses a second, inner cabin-shaped container or section denoted as a whole as 2. The aforesaid sections, 1 and 2, are separated from each other by a completely surrounding air space or column 3. As a separating unit between the aforesaid outer and inner sections, 1 and 2, a number of elements of vibration-absorbing material are utilized, 4, 4'. These elements support the inner cabin-shaped section 2 as shown in the drawings, but elements with equivalent properties are also utilized between the vertical walls of the cabin-shaped sections 1, 2, e.g. at the opening for a door, where the vibration-absorbing elements are also utilized as sealing elements.

In the embodiment shown, a fan unit 6 is placed between the two air filters 7, 7' on top of the roof of the outer cabin-shaped section 1. An outlet unit 8 of flexible type connects the inner cabin-shaped section 2 with a plenum or space situated between the two aforesaid air filters 7, 7'. In connection with aforesaid outlet unit 8, a unit for variation of the area of circulation of the outlet unit 8 is arranged. FIG. 1 also shows two inlets 10, 10' arranged adjacent to the floor surface of the inner cabin-shaped section 2. The aforesaid inlets 10, 10' connect the inner cabin-shaped section 2 with the surrounding air column 3. In order to allow adjustment of the air flow through the inner cabin-shaped section 2, a unit 11 for adjusting the area of circulation of the exhaust unit 8 is arranged in the embodiment shown. As shown, the aforesaid unit 11 can in its simplest form consist of a disc valve of known type, which can move axially in relation to the outlet unit 8. Naturally, the aforesaid limitation of the air circulation can also be achieved at the inlets 10, 10'. For the purpose of allowing control of the air pressure in the inner cabin-shaped section 2, a unit for indication of the air pressure 12 is arranged in the inner cabin-shaped section 2. A ventilation unit 13 is arranged to connect the surrounding atmosphere and the inner cabin-shaped section 2. The aforesaid ventilation unit 13 is arranged to open when the pressure exceeds normal working pressure, e.g. when the door of the work cabin is closed. At this point a significant rise in pressure takes place, which is smoothed by the aforesaid ventilation unit 13.

Figure 2:
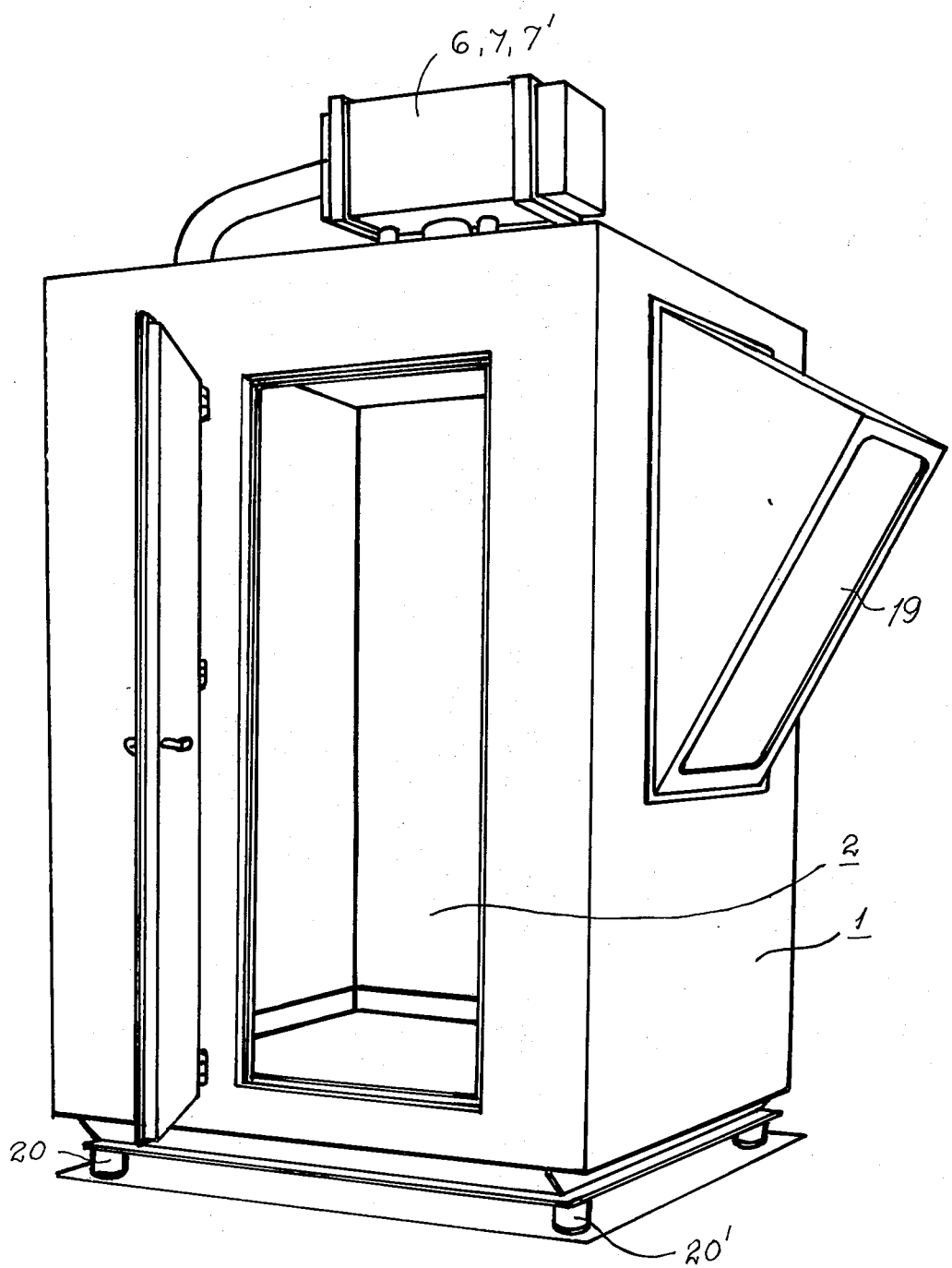
FIG. 2 is a side elevation perspective view of a work cabin according to the present invention.

For the purpose of allowing temperature regulation of the work cabin and the inside air, both cooling and heating units are arranged. A cooling unit 14 is arranged encased adjacent to the work cabin, and connected with the surrounding atmosphere by means of an air filter 15. A cooling coil 16, connected to the cooling unit 14, is connected to a fan unit 17 communicating with the upper part of the inner cabin-shaped section 2. Heating of the circulating air can be carried out either by applying electrically heatable material to all or part of the inner walls of the outer cabin-shaped section 1, or by placing electric radiators by the inner walls of the inner cabin-shaped section 2. In order to further insulate the inner cabin-shaped section 2 from noise as well as surrounding temperatures, a sound and heat insulating material 18 of known type is applied to the inner surfaces of the outer cabin-shaped section 1. The embodiment shown also includes a window area 19, (FIGS. 2 +4) which is arranged inclined upwards/-outwards.

The embodiment of a work cabin according to the present invention shown in the drawings displays significant advantages over earlier known types of work cabins.

By arranging the cabin as two cabins, 1 and 2, separated from each other by means of an air column 3, significantly improved thermal insulation is achieved, in addition to improved sound insulation. As an example, a noise level of 82 dB outside the cabin results in a reduction to 46 – 48 dB with the fan unit 6 not in operation. The aforesaid noise level naturally increases if the fan unit 6 is in operation, in which case the noise level reaches up to 60 dB, which means that a reduction of 22 dB is achieved.

One advantage of the recirculation system according to the present invention is that the circulating air speed can be kept low, without neglecting the degree of purity. As a typical example, with the measuring point in the centre of the inner cabin-shaped section 2, the following values can be given:

Without cooling fan: 0.15 m/s
With cooling fan: 0.35 m/s

These values of the circulating air speed present unacceptable draughts as in earlier known types of work cabins.

In the work cabin, the unit 12 for indication of the air pressure serves two purposes. The aforesaid unit 12 allows adjustment to a suitable working pressure, and also indicates when a change of filter should take place. For this, 1.5 mm water column can be stated as a suitable limit.

The important advantage of the described recirculation system for air is naturally the higher degree of purity which is achieved in combination with a significantly increased lifetime for the air filters 7, 7'.

In order to further illustrate the high purifying effect which is achieved with a ventilation system arranged for a work cabin according to the present invention, the values shown below have been measured. The measurement interval was 1.3 minutes.

Number of particles per 3 1 air
(particle size in u)

| 0,3 – 0,5 | 0,5 – 1 | 1 – 10 | 10 | |
|---|---|---|---|---|
| 6693 | 3210 | 2280 | 14 | |
| 2548 | 1452 | 1054 | 0 | |
| 1047 | 642 | 449 | 0 | |
| 552 | 376 | 254 | 0 | |
| 254 | 146 | 103 | 0 | |
| 154 | 103 | 59 | 0 | |
| 73 | 47 | 40 | 0 | |
| 47 | 27 | 24 | 0 | |
| 25 | 21 | 8 | 0 | |
| 15 | 13 | 8 | 0 | |
| 8 | 7 | 2 | 0 | Class 100 |
| 3 | 3 | 1 | 0 | " |
| 4 | 2 | 2 | 0 | " |
| 1 | 1 | 2 | 0 | " |

From the table shown above it is clear that the work cabin according to the present invention in a period of 10 – 15 minutes reaches a degree of purity equivalent to or exceeding purity class 100, which corresponds to demands for a degree of purity placed on bacteriological work. Comparable results are entirely out of the realms of possibility for earlier known types of work cabins.

Figure 4:
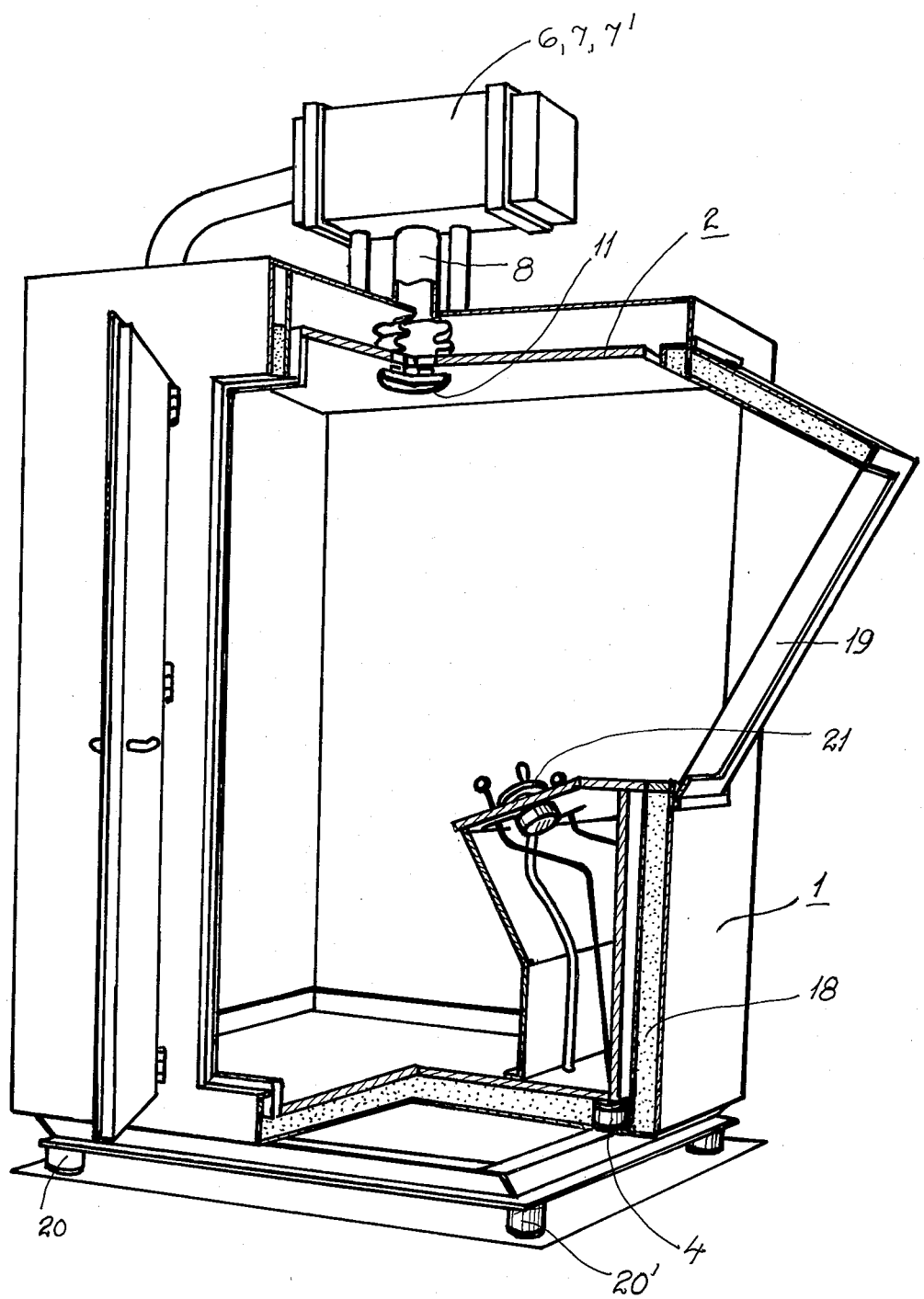
FIG. 4 is a cut-away side elevation perspective view of the work cabin according to the present invention, arranged with an operating panel.

As shown in FIG. 4, the work cabin according to the present invention can be equipped with an operating panel 21, from which an operator can operate machines, etc., arranged outside the cabin. For the purpose of improving the operator's visual contact with the aforesaid machines, the cabin according to the present invention is provided with a glass area 19 inclined upwards/outwards. The visual contact is hereby significantly improved and reflections in the glass surface 19 are avoided.

Because the inner cabin-shaped section 2 is connected to the outer section 1 by means of vibration-reducing elements 4, 4', the transmission of unhealthy vibrations to the operator is avoided. This effect is further increased by the arrangement for the outer cabin-shaped section 1 to be supported by vibration-reducing elements 20, 20'.

The work cabin according to the present invention is in every way well adapted to the environments in which there is not now any satisfactory protection. Because it is designed as a mobile unit, great advantages are also gained. The work cabin's cooling apparatus 14 is further protected in a particularly good way by its enclosure and the only contact with the surrounding atmosphere takes place through the air filter 15.

It should also be emphasized that the construction according to the present invention results in a thermal insulation from the surrounding atmosphere by means of the insulating material 18 in combination with the air column 3.

The air inside the inner cabin-shaped section 2 can hereby be kept at desired temperature with a minimum of extra energy, regardless of the air temperature in the atmosphere surrounding the cabin. This condition is further emphasized by the fact that a large portion of the air is recirculated in the system and thus temperature compensation is, to a greater extent, not required.

It should be emphasized that the embodiment described above and shown in the drawings is only intended to serve as an example of a suitable embodiment. Many other embodiments are also possible within the scope of this invention.

I claim:

1. A work cabin for use in unhealthy environments comprising: two cabin-shaped containers comprising an inner container positioned within an outer container and spaced therefrom to form an air space surrounding said inner container; at least one inlet connecting said air space with the space contained by the inner container; fan means with at least two air filter means spaced from each other; outside air inlet means positioned on the upstream side of a first filter means; outlet means on the downstream side of a second filter connecting to said air space; a second outlet means for exhausting the air from said space in the inner container to a plenum between the downstream side of the first filter means and the upstream side of the second filter means; and a number of vibration-absorbing elements made of elastic material separating said inner and outer containers.

2. The work cabin according to claim 1 comprising further means for regulation of the circulation positioned at the second outlet means.

3. The work cabin according to claim 1 wherein the inside surface of the outer container is covered with a sound and heat insulating material.

4. The work cabin according to claim 1 wherein the inner container is connected to the atmosphere surrounding the outer container by means of ventilation means arranged to open when the pressure in the space contained by the inner container exceeds normal working pressure.

5. The work cabin according to claim 1 wherein a means for indication of the inside air pressure is positioned in the inner container.

6. The work cabin according to claim 1 wherein said at least one inlet is arranged adjacent to the floor level.

7. The work cabin according to claim 1 wherein the outer container is supported by further vibration-absorbing elements made of elastic material.

8. The work cabin according to claim 1 wherein the air pressure inside said space contained by the inner container exceeds the surrounding atmospheric pressure.

9. The work cabin according to claim 1 wherein at least one window area with the surface inclined upwards and outwards is arranged in one of the walls.

10. The work cabin according to claim 1 wherein there is a third outlet means connecting said space contained by the inner container to the surrounding atmosphere, which outlet means functions when the pressure in said space reaches a predetermined level above atmospheric pressure.

* * * * *